United States Patent
Jeong et al.

(10) Patent No.: US 6,654,423 B2
(45) Date of Patent: Nov. 25, 2003

(54) PID/SECTION FILTER IN DIGITAL TELEVISION SYSTEM

(75) Inventors: Soo Gil Jeong, Seoul (KR); See Hyun Kim, Kyungki-Do (KR); Kyu Seok Kim, Kyungki-Do (KR); Chang Kyu Kim, Seoul (KR); Jin Hong Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 514 days.

(21) Appl. No.: 09/726,570

(22) Filed: Dec. 1, 2000

(65) Prior Publication Data

US 2001/0002907 A1 Jun. 7, 2001

(30) Foreign Application Priority Data

Dec. 2, 1999 (KR) .............................. 99/54453

(51) Int. Cl.[7] ................................ H04N 7/12
(52) U.S. Cl. ................................ 375/240.29
(58) Field of Search ............... 375/240.29, 240.26; 348/3, 6, 7, 10, 12, 13; 725/136, 110, 151, 61, 5, 40, 87; H04N 7/12

(56) References Cited

U.S. PATENT DOCUMENTS

| | | | |
|---|---|---|---|
| 6,191,782 B1 * | 2/2001 | Mori et al. ................... | 725/37 |
| 6,226,794 B1 * | 5/2001 | Anderson et al. ............ | 725/131 |
| 6,314,572 B1 * | 11/2001 | LaRocca et al. .............. | 725/60 |
| 6,459,427 B1 * | 10/2002 | Mao et al. .................. | 725/109 |
| 2003/0007568 A1 * | 1/2003 | Hamery et al. ........ | 375/240.26 |

* cited by examiner

*Primary Examiner*—Nhon Diep
(74) *Attorney, Agent, or Firm*—Fleshner & Kim, LLP

(57) ABSTRACT

The present invention relates to a PID/section filter which is adapted without any restriction to an ATSC standard or a DVB standard, comprising a processor module for detecting a PID and a TID by decoding the input transport stream, downloading the information requested by the viewer, and controlling the operation of the each system unit in order to store the information on a memory or ignores it, a PID comparing circuit module for comparing the PID value stored on an internal register with the PID value from the processor module, a download circuit module for downloading the extracted information among the decoded information by the processor module, and an external memory managing module for storing the information extracted in-accordance with the request of the viewer among the information decoded on the processor module.

16 Claims, 3 Drawing Sheets

Memory start & end point registers for each Data Type

External memory for all Data Type

|  | Number of matched PIDs | Data type |
|---|---|---|
| first comparing result | 32 | 0 |
| second comparing result | 31 | 1 |
| third comparing result | 30 | 2 |

PID/SECTION FILTER IN DIGITAL TELEVISION SYSTEM

BACKGROUND OF THE INVENTION

1. Field of the Invention

The present invention relates to a digital television system, particularly to a PID/section filter which is adapted without any restriction to an ATSC (Advanced Television System Committee) standard for a digital television broadcasting in U.S.A or a DVB (Digital Video Broadcasting) standard for a digital satellite broadcasting in Europe.

2. Description of the Related Art

In a digital television system using a MPEG2 standard such as ATSC (Advanced Television System Committee) standard for a digital television broadcasting in U.S. or a DVB (Digital Video Broadcasting) standard for a digital satellite broadcasting in Europe, a transport stream is a means of multiplexing an audio/video stream of various programs by packet using an error correction code and transmitting the multiplexed audio/video stream.

The transport stream is transmitted by a predetermined transmission unit (example; 188 byte), the each unit of transport stream includes a PID (Packet Identifier) as information showing what information is contained in the corresponding transport stream. Accordingly, the PID/section filter in receiving part decodes transport stream being received, extracts the information requested by a viewer from the decoded information, and downloads it to an external device, stores it in a memory, or discards it on the basis of the PID.

However, general PID/section filters have a structure that can support either ATSC standard or DVB standard.

As an example of the general PID/section filters, a SGS-Thomson's ST20-TP2 chip decodes a DVB stream by using a processor, and a section filtering part is constructed as a hardware. And the chip includes thirty two filters for filtering thirty two sections of the packet at the same time, wherein each filter requires 8 byte section header data and 8 byte mask data for designating whether the 8 byte section header data is used for filtering or not. Accordingly, a fixed memory of the total 512 byte (32×8×2=512) is used. However, there is a limitation to perform filtering by using the SGS-Thomson's ST20-TP2 chip because in both ATSC and DVB systems there are sections including some fields additionally required for filtering besides the basic 8 byte.

As another example of the general PID/section filters, a PID/section filter of a LG's GDC21S802A chip specialized for the ATSC has a disadvantage that it can not support the DVB or other standard.

As further example of the general PID/section filters, LSI Logic L64118 chip with combined function of ATSC and DVB systems comprises thirty two PID registers, and supports section filtering for thirty PIDs. The LSI Logic L64118 comprises thirty two filters, each filter is constructed as data for filtering up to 12 byte including a section header. However, such a decoding chip has a disadvantage of low efficiency in the memory.

As described above, since the PID/section filters according to the conventional technology can support only one of the ATSC standard or the DVB standard, an application range of a product is limited, filtering is limited due to the limitation of the field used as the section filter, and resources are squandered away since the memory is inefficiently used.

SUMMARY OF THE INVENTION

The object of the present invention is to provide a PID/section filter which is capable of supporting both an ATSC standard and a DVB standard, and maximizing the efficiency of a memory.

In order to achieve the object, the PID/section filter according to the present invention comprises: a processor module for decoding an input transport stream, detecting a PID(Packet ID) and a TID(Table ID) from the decoded transport stream, and extracting a viewer requested information from the decoded information; a PID comparing circuit module for comparing a PID value received from the processor module with a PID value stored in each internal register and feeding back the comparing result to the processor module; a download circuit module for downloading the information extracted from the information decoded by the processor module to an external device upon request of the viewer; and an external memory module for storing the information extracted upon request of the viewer in an external memory.

The PID/section filter according to the present invention further comprises an external controller module for recording the PID value corresponding to the viewer requested information on the PID comparing circuit module, and recording the information to be filtered by the processor module in a filter memory.

DETAILED DESCRIPTION OF THE PREFERRED EMBODIMENT

Hereinafter, the operation and effect of a PID/section filter according to the present invention will now be described in detail with reference to accompanying drawings.

Figure 1:
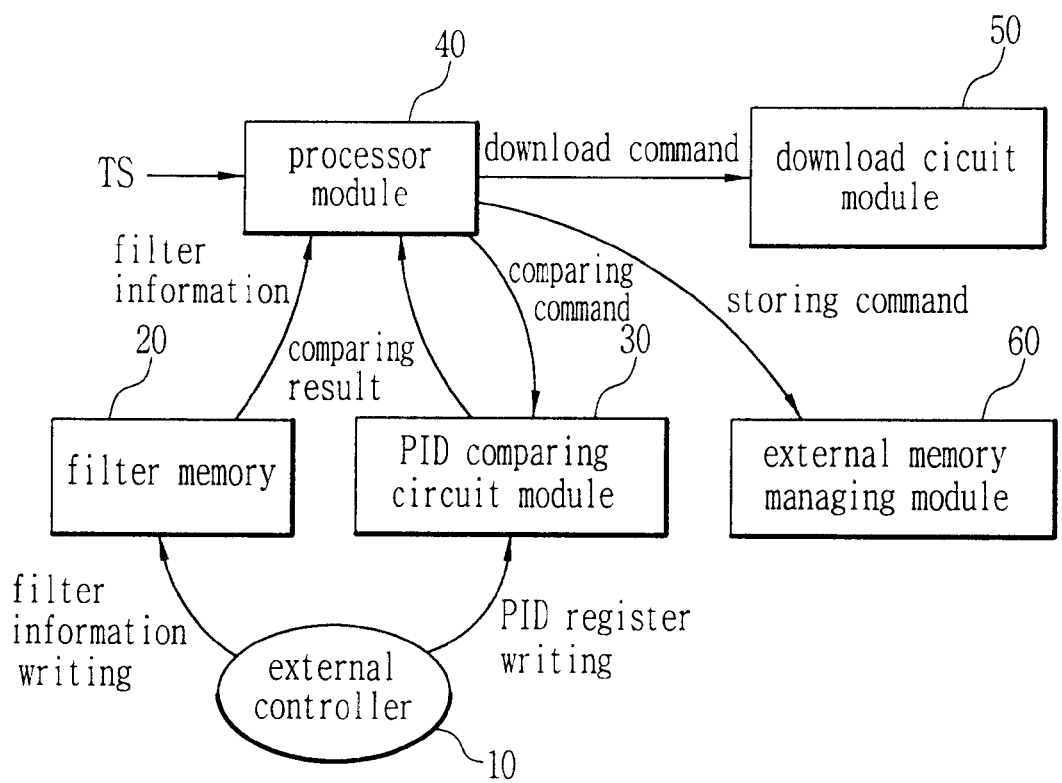
FIG. 1 is a block diagram illustrating the construction of a PID/section filter according to the present invention.

FIG. 1 is a block diagram illustrating a construction of the PID/section filter according to the present invention. When a viewer sends a control command to the external controller module 10 by using a remote-controller in order to find information about a broadcasting program, the external controller module 10 records a PID value corresponding to the requested information at each PID register of a PID comparing circuit module 30, and stores the required filter information in a filter memory 20 such that a processor module 40 outputs corresponding information.

Figure 3:
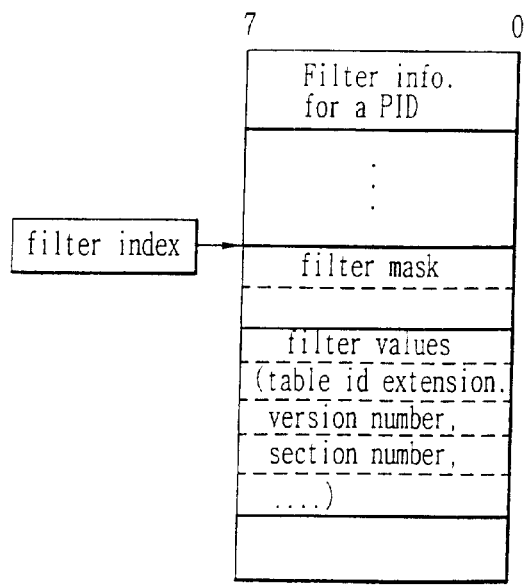
FIG. 3 illustrates a data format of a filter memory in FIG. 1.

The processor module 40 decodes transport stream of predetermined bytes (example: 188 bytes) received from an external device, detects a PID and a TID (Table ID) from the decoded transport stream, and requests the PID comparing circuit module 30 for comparing of the detected PID and TID. And the processor module 40 filters sections comprised in the transport stream on the basis of the filter information stored in the filter memory 20 as a data format illustrated in FIG. 3 by the external controller 10.

A 16 bit filter mask region of the filter memory 20 indicates whether the filtering is performed for each byte from the top of the section header region. For example, when the value of the filter mask region is 0x000f, it means that filtering the upper 4 bytes of the header. In this case, the 4 bytes value to be used for filtering is recorded in the next region of the filter mask region.

Figure 2A:
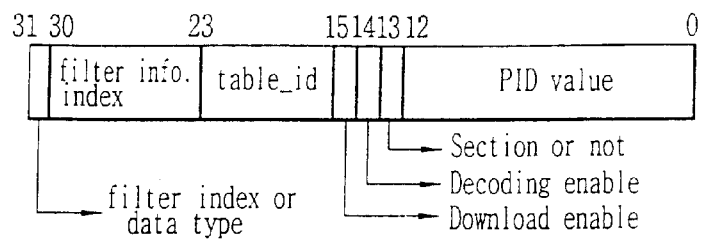
FIG. 2a illustrates a format of a PID register in a PID comparing circuit module of FIG. 1.
Figure 2B:
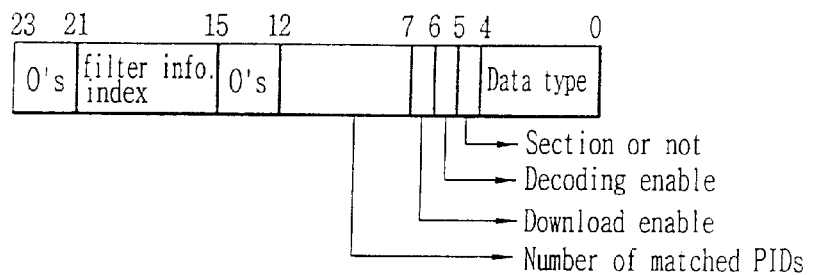
FIG. 2b illustrates a format of the PID register for outputting a comparing result from the PID comparing circuit module.

Whenever the processor module 40 requests for comparing of the PID and TID, the PID comparing circuit module 30 compares the value of comparing object received from the processor module 40 with the value separately stored in the thirty-two internal registers, which of a structure as depicted in FIG. 2a. The comparing result of the PID comparing circuit module 30 is transmitted to the processor module 40 in the structure depicted in FIG. 2b. For the transmission of the comparing result to the processor module 40, the PID comparing circuit module 30 comprises one register for storing the PID inputted as the comparing object and another one register for storing the table ID as well as the thirty-two internal registers.

The contents of the PID register depicted in FIG. 2a are recorded by the external controller 10. The PID register has a structure comprising a first region(PID value) for indicating the PID value to be compared, a second region(Section-or-not) for indicating whether syntax of packet assigned to PID has a section structure or not, a third region(Decoding Enable) for indicating whether it decodes the packet corresponding to the PID, a fourth region(Download Enable) for indicating whether it directly transmits the packet corresponding to the PID to the external device, a fifth region (Table-ID) for indicating the TID value of the section to be decoded, a sixth region (Filter Information Index) for indicating a starting address of the memory storing the information to be used for the section filtering, and a seventh region (filter Index-or-Data type) for indicating the usage of the sixth region (Filter Information Index). When the value of the seventh region (filter Index-or-Data type) is '0', it means it is used for the original use, when the value of the seventh region is '1', it means it is used for the data type.

The PID comparing circuit module 30 comprises thirty-two PID registers having the above-described structure, and it further comprises a reference PID register and a TID register used upon the comparing request by the processor module 40.

In addition, the comparing result of the PID comparing circuit module 30 is transmitted to the processor module 40 in the structure depicted in FIG. 2a. The register depicted in FIG. 2b comprises a first region(Data Type) for indicating which one of the thirty two PID registers is matched to the comparing result by the processor module 40, a second to fourth regions(Section-or-not, Decoding Enable and Download Enable) having the same function as described in FIG. 2a, a fifth region(Number of matched PIDs) for indicating the number of the PID registers matched as a result of comparison, and a sixth region(Filter Information Index) for indicating the starting address of the memory storing the information to be used for section filtering.

Herein, the PID comparing circuit module 30 compares PID and TID, but when the value of the TID region (Table-ID) of the PID register or TID register is 0xFF, it compares only the PID judging that TID is matched each other. In other words, using the 0xFF as the TID means that said region should not be compared, which indicates that the 0xFF value is an inhibited value for the TID in the MPEG standard.

Upon comparison, in case that there exist several matched PID register values, the PID registers having an available memory region maybe transmitted in a descending order or in an ascending order based on its data type number.

At next step, the processor module 40 stores corresponding packet decoded from the transport stream in a predetermined memory region in accordance with the comparing result received from the PID comparing circuit module 30.

In other words, when the number of the matched PID is '0', the corresponding packet is discarded. On the other hand when the number of the matched PID is '1' and it does not have the section structure, the packet is stored in the corresponding data memory region. When the number of the matched PID register is '1' and it has the section structure, the filtering is performed according to the filter information of the filter memory depicted in FIG. 3. Hereinafter it is judged whether the corresponding packet is stored in the memory region corresponding to the data type according to the filtering result.

Moreover when it is judged that matched PID registers are over two and those are not of the section structure, the processor module 40 stores the packet in the region corresponding to the data type value transmitted from the PID comparing circuit module 30. When it is judged that matched PID registers are over two and those are of the section structure, the filtering is performed according to the filter information of the filter memory 20 depicted in FIG. 3. Afterwards, the packet is stored in the corresponding data type region when the result of filtering is matched to the filter information.

Herein, upon receiving the download command from the processor module 40, the download circuit module 50 directly transmits the corresponding packet to an external hardware without passing through the external memory. This function is efficient in a case an input stream is the one having a high band-width because the corresponding packet can be stored in the external hardware merely without additional processing.

Then, the external memory module 60 maintains the registers for controlling the external memory region corresponding to the data type of the thirty-two PID registers, and stores the decoded-data in the external memory.

Figures 4, 5:
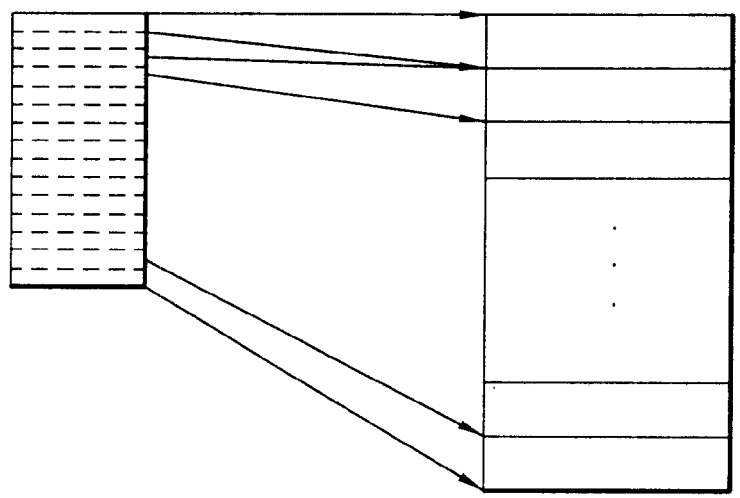
FIG. 4 is a perspective view illustrating a structure of a register in an external memory module of FIG. 1.
FIG. 5 is a table illustrating the comparing result from the PID comparing circuit module.

In other words, as depicted in FIG. 4, the external memory module 60 stores the start and end address of the memory region received from the external controller 10. And upon receipt of a command for storing the Data Type assigned by the processor module 40, it stores the data in the corresponding region.

As described above, various matching between the PID register and buffers of the external memory module 60 can be realized by utilizing the interaction of each module.

As an example of the matching methods, a plurality of the memory buffers can be matched to one PID. In this method, same PID value is recorded on the plurality of the PID registers. For example, in a case that the same PID is recorded on the thirty-two PID registers, the PID comparing circuit module 30 provides the processor module 40 with the comparing result as the format depicted in FIG. 5. Accordingly the external memory module 60 can store the data by using the thirty-two memory buffers.

This function has an advantage that the consecutive data transmitted with the high band width such as the data broadcasting can be received in short period of time without any loss.

As another example of the matching methods, one memory buffer can be matched to plural PIDs. This method is implemented by recording each PID on each PID register, recording the value of the seventh region (Filter Index_or_Data type) in FIG. 2a as '1', and recording the value of the sixth region (Filter Index or Data Type) in FIG. 2b as a specific data type value.

In this case, the PID comparing circuit module 30 transmits the result having the same data type value for each PID to the processor module 40, and the processor module 40 transmits a command for storing the data in the same memory buffer to the external memory module 60.

By utilizing this function, the efficiency of the memory can be improved because the memory of small capacity can be used for receiving the data without requiring the rapid processing.

Accordingly, the PID/section filter according to the present invention can support both the ATSC (Advanced Television System Committee) standard and DVB (Digital Video Broadcasting) standard. This is realized by storing the information such as the PID(Packet Identifier) and TID (Table Identifier) at the plurality of internal registers of the PID comparing circuit module, comparing a value of object to be compared with the values stored in the internal registers whenever the processor module requests a comparison for PID and TID, and detecting the viewer requested information from the decoded information for subsequent processing of download or discard.

In addition, in maintaining the registers to match the data type of each PID register in the PID comparing circuit module, the external memory module 60 can maintain the registers by matching one PID to plural memory buffers or matching plural PIDs to one memory buffer. Accordingly, the PID/section filter according to the present invention has an effect of efficiently using the memory.

What is claimed is:

1. A PID/section filter comprising:
   a processor module for decoding an input transport stream, detecting a PID (Packet Identifier) and a TID (Table Identifier) from the decoded transport stream, and extracting a viewer requested information from the decoded information;
   a PID comparing circuit module for comparing a PID value received from the processor module with a PID value stored in each internal register, and performing feedback of the comparing result to the processor module;
   a download circuit module for downloading the information extracted upon request of the viewer from the information decoded by the processor module to an external device; and
   an external memory managing for storing the information extracted from the information decoded in the processor module to the external memory.

2. The PID/section filter according to claim 1, further comprising an external controller module for recording the PID value corresponding to the viewer requested information on the PID comparing circuit module, and recording the information to be filtered by the processor module in a filter memory.

3. The PID/section filter according to claim 2, wherein the filter memory includes a filter mask region for indicating from which part of a section header filtering for each byte is performed.

4. The PID/section filter according to claim 3, wherein the filter mask region of the filter memory comprises 16 bits data.

5. The PID/section filter according to claim 1, wherein the processor module extracts the viewer requested information from the decoded information on the basis of the comparing result fed back from the PID comparing circuit module.

6. The PID/section filter according to claim 5, wherein the processor module discards the corresponding packet when the matched value of the PID register fed back from the PID comparing circuit module is inputted as '0'.

7. The PID/section filter according to claim 5, wherein the processor module stores the packet on the corresponding data memory region when the matched value of the PID register is '1' and it does not have a section structure, and wherein the processor module performs filtering operation based upon the filter information and then determines whether it stores the corresponding packet on the memory region corresponding to the data type in accordance with the filtering result when the matched value of the PID register is '1' and it has a section structure.

8. The PID/section filter according to claim 5, wherein the processor module stores the packet on the region corresponding to the data type value transmitted from the PID comparing circuit module when matched PID registers are over two and they do not have a section structure, and wherein the processor module performs filtering operation based upon the filter information of the filter memory and then stores the packet matched to the filter information in the corresponding data type region when matched PID registers are over two and they have a section structure.

9. The PID/section filter according to claim 1, wherein the PID comparing circuit module comprises:
   thirty-two internal registers having same data format;
   one register for storing the PID inputted as a comparing object; and
   one register for storing a TID (Table ID).

10. The PID/section filter according to claim 9, wherein the internal registers of the PID comparing circuit module comprises:
    a first region for indicating the PID value to be compared;
    a second region for indicating whether a syntax of the packet assigned to the PID has section structure or not;
    a third region for indicating whether it decodes the packet corresponding to the PID;
    a fourth region for indicating whether it directly transmits the packet corresponding to the PID to the external device;
    a fifth region for indicating the TID value of the section to be decoded;
    a sixth region for indicating a start address of the memory storing the information to be used for the section filtering; and
    a seventh region for indicating the usage of the sixth region.

11. The PID/section filter according to claim 10, wherein the PID/section filter is used for the original purpose when the value of the seventh region is '0', and is used for the data type when the value of the seventh region is '1'.

12. The PID/section filter according to claim 1, wherein the register for outputting the comparing result in the PID comparing circuit module comprising;
    a first region for indicating which one of the plurality of the PID registers is matched to the comparison request by the processor module;
    a second region for indicating whether syntax of the packet designated on the PID has a section structure or not;
    a third region for indicating whether it decodes the packet corresponding to the PID;
    a fourth region for indicating whether it directly transmits the packet corresponding to the PID to the external device;
    a fifth region for indicating the number of the PID registers matched as a result of comparison; and a sixth region for indicating a start address of the memory storing the information to be used for the section filtering.

13. The PID/section filter according to claim 1, in case that there exist several PID register values that are identical each other after comparison, the PID registers having an available region maybe transmitted in a descending order or in an ascending order based on its data type number.

14. The PID/section filter according to claim 1, wherein the external memory module receives start and end addresses of the memory region for each data type from the external controller and stores those addresses, and stores the data in the corresponding region when a command for storing specific data type is received from the processor module.

15. The PID/section filter according to claim 14, wherein the external memory module stores the data by matching one PID and one TID to the plurality of the memory buffers.

16. The PID/section filter according to claim 14, wherein the external memory module stores the data by matching the plurality of the PID, TID to one memory buffer.

* * * * *